United States Patent
Wan

(10) Patent No.: US 10,142,323 B2
(45) Date of Patent: Nov. 27, 2018

(54) ACTIVATION OF MOBILE DEVICES IN ENTERPRISE MOBILE MANAGEMENT

(71) Applicant: Huawei Technologies Co., Ltd, Shenzhen, Guangdong (CN)

(72) Inventor: Tao Wan, Ottawa (CA)

(73) Assignee: HUAWEI TECHNOLOGIES CO., LTD. (CN)

( * ) Notice: Subject to any disclaimer, the term of this patent is extended or adjusted under 35 U.S.C. 154(b) by 200 days.

(21) Appl. No.: 15/095,887

(22) Filed: Apr. 11, 2016

(65) Prior Publication Data

US 2017/0295168 A1 Oct. 12, 2017

(51) Int. Cl.
*H04L 29/06* (2006.01)

(52) U.S. Cl.
CPC ...... *H04L 63/0823* (2013.01); *H04L 63/0876* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 6,980,660 B1 * | 12/2005 | Hind | H04L 63/0823 380/277 |
| 9,641,344 B1 * | 5/2017 | Kim | H04L 9/3268 |
| 2001/0020274 A1 | 9/2001 | Shambroom | |
| 2004/0268142 A1 * | 12/2004 | Karjala | H04L 63/0272 726/15 |
| 2005/0210252 A1 * | 9/2005 | Freeman | G06F 21/31 713/171 |
| 2010/0064341 A1 * | 3/2010 | Aldera | H04L 63/102 726/1 |
| 2013/0046976 A1 * | 2/2013 | Rosati | H04L 63/0853 713/168 |

(Continued)

FOREIGN PATENT DOCUMENTS

| | | |
|---|---|---|
| CN | 101286871 A | 10/2008 |
| CN | 104348846 A | 2/2015 |
| CN | 105337977 A | 2/2016 |

OTHER PUBLICATIONS

BlabckBerry Device Service Solution, "Security Technical Overview", Jun. 17, 2014, 156p.

*Primary Examiner* — Maung T Lwin
*Assistant Examiner* — Olanrewaju J. Bucknor
(74) *Attorney, Agent, or Firm* — Norton Rose Fulbright Canada LLP

(57) ABSTRACT

The present disclosure is drawn to systems and methods for activating a mobile device in an enterprise mobile management context. The mobile device is configured to generate a first device security certificate which comprises a device key and an identifier of the mobile device. The device key corresponds to a shared secret known to the mobile device and to an authentication server. The mobile device sends the first device security certificate to the authentication server. The authentication server validates the mobile device by comparing the device key to a server key and by locating the identifier in a list of known identifiers. When the mobile device is validated, the authentication server sends a first server security certificate to the mobile device. The first device and server security certificates may then be used to establish a secure connection, over which a second set of device and server certificates may be enrolled.

18 Claims, 12 Drawing Sheets

(56) References Cited

U.S. PATENT DOCUMENTS

| | | | |
|---|---|---|---|
| 2014/0053250 A1* | 2/2014 | Wethington | H04L 63/10 726/5 |
| 2014/0075513 A1* | 3/2014 | Trammel | H04L 9/3213 726/4 |
| 2014/0164781 A1* | 6/2014 | Joshi | G06F 21/31 713/184 |
| 2014/0181909 A1* | 6/2014 | Birk | H04L 63/105 726/4 |
| 2014/0258711 A1* | 9/2014 | Brannon | H04L 63/0823 713/156 |
| 2016/0057141 A1* | 2/2016 | Van Den Broeck | H04L 9/3268 726/10 |
| 2016/0080423 A1* | 3/2016 | Milinski | H04L 63/304 726/1 |
| 2016/0087972 A1* | 3/2016 | Ahmavaara | H04L 63/0823 726/10 |
| 2016/0119313 A1* | 4/2016 | Zhang | H04L 63/083 726/6 |
| 2016/0134622 A1* | 5/2016 | Singh | H04L 9/3263 726/6 |
| 2016/0344559 A1* | 11/2016 | Ma | H04L 9/3263 |

* cited by examiner

ACTIVATION OF MOBILE DEVICES IN ENTERPRISE MOBILE MANAGEMENT

FIELD

The present disclosure is generally drawn to mobile devices, and more specifically to secure activation of mobile devices in an enterprise mobile management context.

BACKGROUND

Many organizations provide their members with mobile devices to allow their members to remotely access organizational resources, such as email servers and databases. In order to mitigate security concerns, an organization may require that all communication between the organization-provided mobile device and the organizational resources be conducted on secured channels. One way of securing communication channels is by using security certificates.

When a newly-deployed mobile device is provided to a member of the organization, the mobile device may need to be provided with one or more security certificates in order to authenticate the mobile device. Providing the mobile device with one or more security certificates may be done manually, for example by an IT department of the organization storing the security certificates on the mobile device. However, the manual approach may be time consuming and also may require the member to physically give up possession of the mobile device. Alternatively, the mobile device may be provided with the security certificates remotely, over a network. However, current techniques which use challenge-and-response-based authentication protocols are complex and vulnerable to attack.

Therefore, there is a need for solutions for remotely authenticating newly-deployed mobile devices in a secure manner.

SUMMARY

The present disclosure is drawn to systems and methods for activating a mobile device in an enterprise mobile management context. The mobile device is configured to generate a first device security certificate which comprises a device key and an identifier of the mobile device. The device key corresponds to a shared secret known to the mobile device and to an authentication server. The mobile device sends the first device security certificate to the authentication server. The authentication server validates the mobile device by comparing the device key to a server key and by locating the identifier in a list of known identifiers. When the mobile device is validated, the authentication server sends a first server security certificate to the mobile device. The first device and server security certificates may then be used to establish a secure connection, over which a second set of device and server certificates may be enrolled.

In accordance with a broad aspect, there is provided a method. The method comprises generating, at a mobile device, a first device security certificate, the first device security certificate including a representation of an identifier of the mobile device and a representation of a device key. The first device security certificate is transmitted to an authentication server. A server security certificate is received from the authentication server, the server security certificate including a representation of a server key, the server key corresponding to the device key. A secure connection is established with the authentication server based on the device security certificate and the server security certificate, and at least one second device security certificate is enrolled for formal communication over the secure connection.

In some example embodiments, generating the first device security certificate comprises generating a root certificate based on the device key and signing the first device security certificate with the root certificate.

In some example embodiments, generating the first device security certificate having the representation of the identifier of the mobile device comprises providing at least part of an International Mobile Station Equipment Identity (IMEI) of the mobile device in the first device security certificate.

In some example embodiments, generating the first device security certificate having the representation of the identifier of the mobile device comprises providing a hash of the IMEI of the mobile device in the first device security certificate.

In some example embodiments, establishing the secure connection comprises establishing a transport layer security tunnel.

In some example embodiments, enrolling the at least one second server security certificate comprises receiving, from the authentication server, over the secure connection, the at least one second device security certificate signed by a certification authority of the authentication server.

In some example embodiments, the method further comprises deleting the first device security certificate and the server security certificate after the at least one second device security certificate has been enrolled.

In some example embodiments, deleting the first device security certificate and the server security certificate comprises deleting a trust anchor associated with the first device security certificate.

In some example embodiments, the secure connection is a temporary secure connection. The method further comprises establishing at least one formal secure connection, separate from the temporary secure connection, with the authentication server, based on the at least one second device security certificate.

In some example embodiments, establishing the at least one formal secure connection comprises terminating the temporary secure connection after establishing the at least one formal secure connection.

In accordance with a further broad aspect, there is provided a mobile device. The mobile device comprises a processing unit; and a memory, communicatively coupled to the processing unit and comprising computer-readable program instructions executable by the processing unit. The program instructions are executable by the processing unit for generating, at a mobile device, a first device security certificate, the first device security certificate including a representation of an identifier of the mobile device and a representation of a device key; transmitting the first device security certificate to an authentication server; receiving a server security certificate from the authentication server, the server security certificate including a representation of a server key, the server key corresponding to the device key; establishing a secure connection with the authentication server based on the device security certificate and the server security certificate; and enrolling at least one second device security certificate for formal communication over the secure connection.

In some example embodiments, generating the first device security certificate comprises generating a root certificate based on the device key, and signing the first device security certificate with the root certificate.

In some example embodiments, generating the first device security certificate having the representation of the identifier of the mobile device comprises providing at least part of an International Mobile Station Equipment Identity (IMEI) of the mobile device in the first device security certificate.

In some example embodiments, generating the first device security certificate having the representation of the identifier of the mobile device comprises providing a hash of the IMEI of the mobile device in the first device security certificate.

In some example embodiments, establishing the secure connection comprises establishing a transport layer security tunnel.

In some example embodiments, enrolling the at least one second server security certificate comprises receiving, from the authentication server, over the secure connection, the at least one second device security certificate signed by a certification authority of the authentication server.

In some example embodiments, the program instructions are further executable by the processing unit for deleting the first device security certificate and the server security certificate after the at least one second device security certificate has been enrolled.

In some example embodiments, deleting the first device security certificate and the server security certificate comprises deleting a trust anchor associated with the first device security certificate.

In some example embodiments, the secure connection is a temporary secure connection, and the program instructions are further executable by the processing unit for establishing at least one formal secure connection, separate from the temporary connection, with the authentication server based on the at least one second device security certificate.

In some example embodiments, establishing the at least one formal secure connection comprises terminating the temporary secure connection after establishing the at least one formal secure connection.

In accordance with a further broad aspect, there is provided a method. The method comprises generating, at an authentication server, a first server security certificate comprising a representation of a server key associated with a mobile device. A device security certificate is received from the mobile device, the device security certificate including a representation of a mobile device identifier and a representation of a device key. The representation of the device key is compared to the representation of the server key and the representation of the mobile device identifier is compared to a list of known mobile device identifier representations to validate the mobile device. The first server security certificate is transmitted to the validated mobile device. A secure connection is established with the validated mobile device based on the device security certificate and the first server security certificate, and at least one second server security certificate is enrolled for formal communication with the validated mobile device.

In some example embodiments, generating a first server security certificate comprises generating a root certificate based on the server key, and signing the first server security certificate with the root certificate.

In some example embodiments, generating the first server security certificate comprises generating the first server security certificate based on a randomly-generated key pair.

In some example embodiments, the representation of the mobile device identifier is an International Mobile Station Equipment Identity (IMEI).

In some example embodiments, the representation of the mobile device identifier is a hash of an International Mobile Station Equipment Identity (IMEI).

In some example embodiments, establishing the secure connection comprises establishing a transport layer security tunnel.

In some example embodiments, enrolling the at least one second server security certificate comprises generating the at least one second server security certificate, and signing the at least one second server security certificate with a certification authority.

In some example embodiments, the method further comprises deleting the device security certificate and the first server security certificate after the at least one second server security certificate has been enrolled.

In some example embodiments, the secure connection is a temporary secure connection, and further comprising establishing at least one formal secure connection, separate from the temporary secure connection, with the mobile device, based on the at least one second server security certificate.

In some example embodiments, establishing the at least one formal secure connection comprises terminating the temporary secure connection after establishing the at least one formal secure connection.

In accordance with another broad aspect, there is further provided an authentication server. The authentication server comprises a processing unit; and a memory, communicatively coupled to the processing unit and comprising computer-readable program instructions executable by the processing unit. The program instructions are executable by the processing unit for generating, at an authentication server, a first server security certificate including a representation of a server key associated with a mobile device. T device security certificate is received from the mobile device, the device security certificate having a representation of a mobile device identifier and a representation of a device key. The representation of the device key is compared to the representation of the server key, and the representation of the mobile device identifier is compared to a list of known mobile device identifier representations to validate the mobile device. The first server security certificate is transmitted to the validated mobile device. A secure connection is established with the validated mobile device based on the device security certificate and the first server security certificate, and at least one second server security certificate is enrolled for formal communication with the validated mobile device.

In some example embodiments, generating a first server security certificate comprises generating a root certificate based on the server key, and signing the first server security certificate with the root certificate.

In some example embodiments, generating the first server security certificate comprises generating the first server security certificate based on a randomly-generated key pair.

In some example embodiments, the representation of the mobile device identifier is an International Mobile Station Equipment Identity (IMEI).

In some example embodiments, the representation of the mobile device identifier is a hash of an International Mobile Station Equipment Identity (IMEI).

In some example embodiments, wherein establishing the secure connection comprises establishing a transport layer security tunnel.

In some example embodiments, enrolling the at least one second server security certificate comprises generating the at least one second security certificate, and signing the at least one second server security certificate with a certification authority.

In some example embodiments, the program instructions are further executable by the processing unit for deleting the device security certificate and the first server security certificate after the at least one second server security certificate has been enrolled.

In some example embodiments, the secure connection is a temporary secure connection, and the program instructions are further executable by the processing unit for establishing at least one formal secure connection, separate from the temporary secure connection, with the mobile device based on the at least one second server security certificate.

In some example embodiments, establishing the at least one formal secure connection comprises terminating the temporary secure connection after establishing the at least one formal secure connection.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings which are briefly described hereinbelow.

It will be noted that throughout the appended drawings, like features are identified by like reference numerals.

DETAILED DESCRIPTION

The present disclosure provides methods, systems, and computer-readable media for remotely authenticating a newly-deployed mobile device. The mobile device may be used to access various corporate and/or organizational resources remotely, including email and databases. In order to secure communications between the mobile device and the corporate or organizational resources, security certificates are used to establish secure connections. A secure connection is established between the mobile device and an authentication server using an authentication procedure. The authentication procedure comprises validating, at the authentication server, that the mobile device knows a key and is part of a list of known mobile devices. If both conditions are satisfied, the mobile device is provided with the appropriate security certificates to establish the secure connection.

Figure 1:
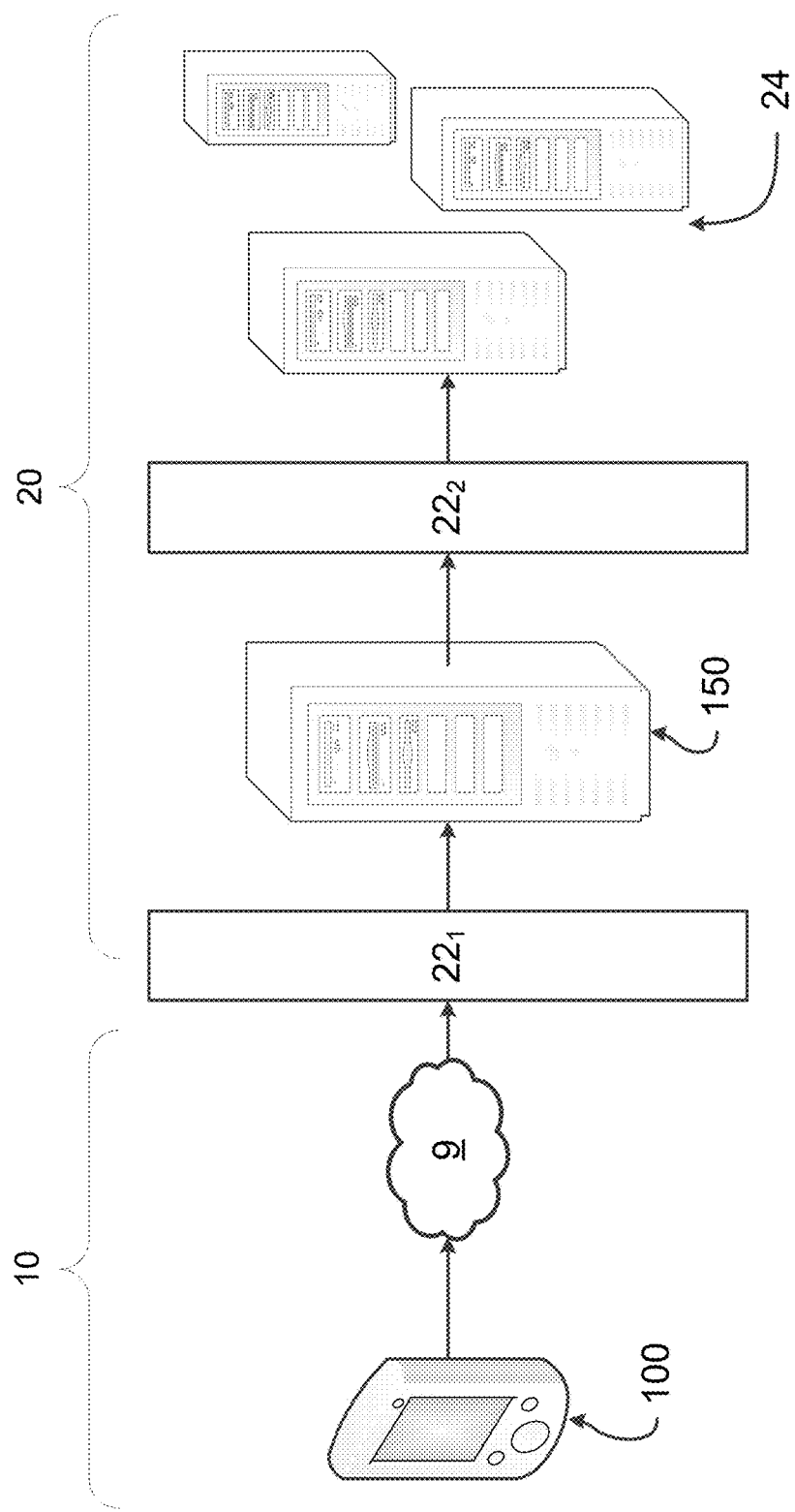
FIG. 1 is a block diagram of an example network for activating mobile devices.

With reference to FIG. 1, there is shown a block diagram of an example embodiment for authenticating a newly-deployed mobile device 100. A network 10 may be a public network, such as a Wi-Fi network, a ZigBee™ network, a Bluetooth™ network, a local-area network (LAN), a wide-area network (WAN), a cellular network, a mobile communication network, and any other suitable network. The network 10 may also comprise the Internet 9. The network may have any number of communication devices connected thereto, including mobile device 100.

The mobile device 100 may be any suitable networked mobile device 100, such as a cellular phone, a feature phone, a smartphone, a phablet, a tablet, a portable computer, an ultraportable, a wearable communication device, and the like. The mobile device 100 may be able to access other networks via the network 10, including a corporate network 20.

The corporate network 20 may be protected by one or more firewalls $22_1$, $22_2$. The corporate network 20 may comprise an authentication server 150 between the firewalls $22_1$, $22_2$. The corporate network 20 may further comprise various corporate resources 24. The corporate resources 24 may include email servers, databases, document management systems, customer relations management systems, and the like. Access to the corporate resources 24 may only be available to mobile devices 100 which have been successfully authenticated by the authentication server 150. More specifically, a mobile device 100 requesting access to the corporate resources 24 may need one or more security certificates provided by the authentication server 150.

Figure 2:
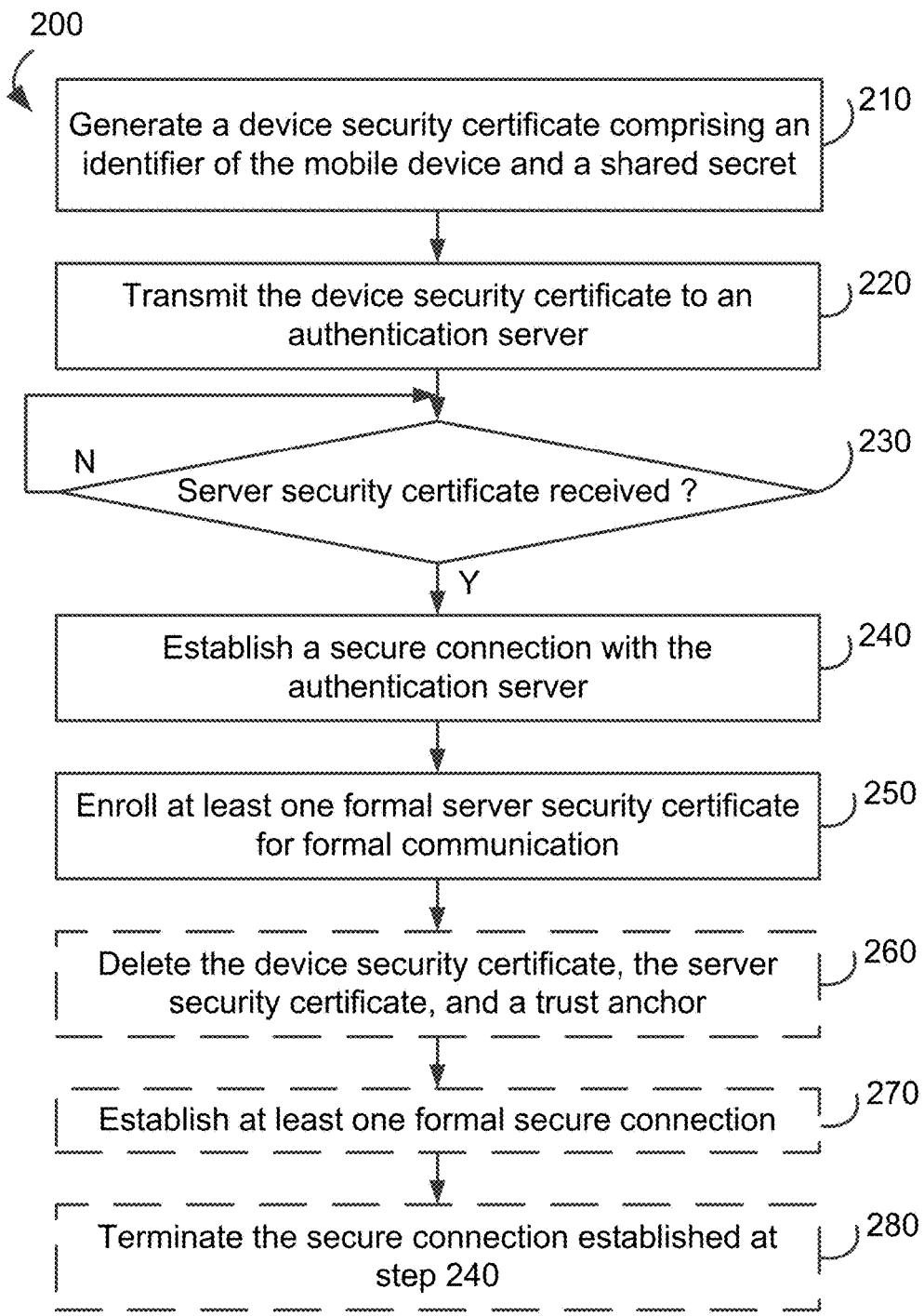
FIG. 2 is a flowchart illustrating a method executed by a mobile device for authenticating the mobile device.

With reference to FIG. 2, the mobile device 100 implements a method 200 for performing an authentication procedure with the authentication server 150. At step 210, the mobile device 100 generates a first device security certificate. A device security certificate is an electronic document such as a public key certificate, a digital certificate, or an identity certificate that is used to prove ownership of a device key. The device security certificate includes information about the device key, information about an identity of the owner of the device security certificate, and the digital signature of an entity that has verified the certificate's contents. If the signature is valid and the system examining the certificate trusts the signer, then the system knows that it can use the device key to communicate with the device.

The first device security certificate includes a representation of an identifier of a mobile device and a representation of a device key. A device key is a term used to refer to a shared secret in a mobile device. A shared secret is a value which is known to both a device and a server. It may be unique or pseudo-unique, and may be associated with a corporation or organization that runs a corporate network to which the device wishes to connect. The shared secret may be any suitable value, including a number, a string, and the like. The shared secret may be provided, for example, by a manufacturer or distributor of the mobile device. The device key may be represented as the shared secret itself, a portion of the shared secret, or a hash or other transformation of the shared secret.

A mobile device identifier is associated with the mobile device and used to identify the mobile device. It can be any suitable unique or pseudo-unique identifying name, number, or other alphanumeric or binary string. In some embodiments, the mobile device identifier is an International Mobile Station Equipment Identity (IMEI) of the mobile device. In some embodiments, the mobile device identifier is a hash or a portion of the IMEI, a serial number, or a telephone number associated with the device. In some cases, only a part of the identifier may be stored, for example only a part of the IMEI, a part of the serial number, or a part of the telephone number. In some embodiments, the part of the identifier may first be hashed, salted, repeated, or otherwise altered in any suitable way, for example to improve security. The identifier of the mobile device may be stored in a Subject Alternate Field (SAN) of the device security certificate, or in any other suitable field, by the mobile device.

The shared secret is referred to as a server key when provided in the authentication server 150. The server key may be represented as the shared secret itself, a portion of the shared secret, or a hash or other transformation of the shared secret. A server security certification is an electronic document such as a public key certificate, a digital certificate, or an identity certificate that is used to prove ownership of a server key. The server security certificate includes information about the server key, information about the identity of an owner of the server key, and the digital signature of an entity that has verified the contents of the server security certificate. If the signature is valid and the system examining the certificate trusts the signer, then the system knows that it can use the server key to communicate with the server.

The device key and the server key are identical when the mobile device 100 is correctly associated with the resources 24 of the network 20. Confirming that the device key and the server key are indeed identical forms part of the authentication procedure, as described in more detail below. The device key and server key may be any suitable data element, for example a number, a word, a string of alphanumeric characters, or any other suitable piece of data. The device key may be provided to the mobile device 100 during a manufacturing process, for example. The mobile device 100 may also regard the device key, and any certificate generated based on the device key, as a trust anchor. Therefore, any certificate generated based on the server key that is identical to the device key may also be viewed as a trust anchor by the mobile device 100.

At step 220, the mobile device 100 transmits the first device security certificate to the authentication server 150. The mobile device 100 transmits the first device security certificate to the authentication server 150 through any suitable means and over any suitable portion of the network 10. For example, the mobile device 100 may transmit the first device security certificate over a mobile communication network. The network may comprise a CDMA network, an EDGE network, an LTE network, an LTE+ network, an HSPA network, or any other suitable network. In some cases, the mobile device 100 may transmit the first device security certificate to the firewall 22₁ or to an element thereof, such as a gateway server (not illustrated), which may then transmit the first device security certificate to the authentication server 150.

The method 200 proceeds to step 240 when the mobile device 100 receives a server security certificate from the authentication server 150. It should be noted that the server security certificate will only be transmitted to the mobile device 100 if the mobile device 100 is authenticated by the authentication server 150, as explained in more detail hereinbelow. The server security certificate may be based on a randomly-generated key pair, or on any other suitable key pair. The mobile device 100 may validate the server security certificate in any suitable fashion, for example by examining a signature of the server security certificate. If the signature of the server security certificate is trusted, the mobile device 100 may conclude that the server security certificate is trusted. The mobile device 100 may trust the signature of the server security certificate based on any suitable factor, for example because the mobile device 100 views the signature of the server security certificate, which contains the server key, as a trust anchor.

At step 240, the mobile device 100 establishes a secure connection with the authentication server 150. The exchange of data between the mobile device 100 and the authentication server 150 may be secured and validated with the device security certificate and the server security certificate. The secure connection may comprise, for example, a transport layer security (TLS) tunnel, or any other suitable secure connection.

At step 250, the mobile device 100 enrolls at least one second device security certificate for formal communication. The second device security certificate may be received from the authentication server 150, or may be generated by the mobile device 100. The second device security certificate may be used by the mobile device 100 to secure and validate formal communication, for example secure connections to the corporate resources 24.

Figure 3A:
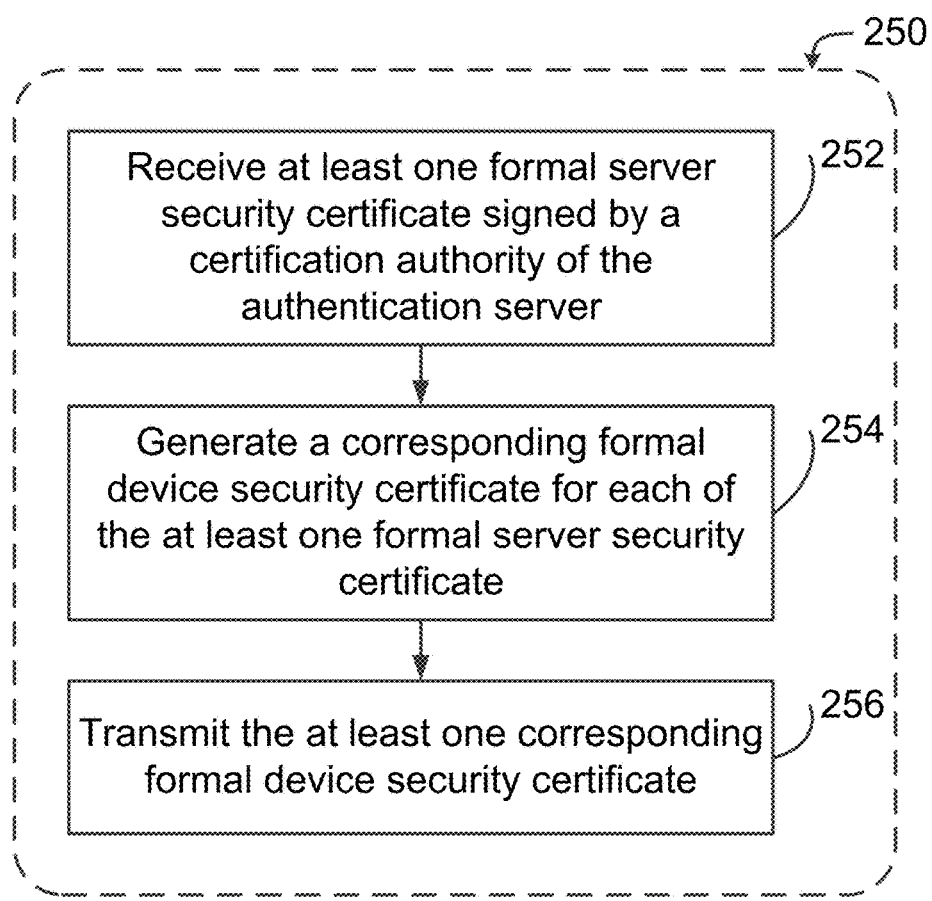
FIGS. 3A-3B are flowcharts illustrating example embodiments for some steps of the method illustrated in FIG. 2.

In some embodiments, and with reference to FIG. 3A, the step 250 includes a plurality of steps 252, 254, 256. At step 252, the mobile device 100 receives at least one second server security certificate. The second server security certificate is received over the secure connection established in step 240 of method 200. The second server security certificate may be signed by a certification authority of the authentication server 150. The mobile device 100 validates the second server security certificate based on the signatures of the second server security certificates.

At step 254, the mobile device 100 generates at least one second device security certificate. Each second device security certificate may correspond to one second server security certificate. The second device security certificate may be generated in any suitable way, and may, for example, be based on a randomly-generated key pair.

At step 256, the mobile device 100 transmits the one or more second device security certificates to the authentication server 150. The second device security certificates are transmitted over the secure connection established in step 240 of method 200.

In some cases, the authentication server 150 may generate both the second server security certificate and the second device security certificate. Thus, at step 250, the mobile device 100 may receive both the second server security certificate and the second device security certificate. The mobile device 100 may then enroll both the second server security certificate and the second device security certificate for use in establishing formal communication.

Referring back to FIG. 2 at step 260, once the second server security certificate has been enrolled, the mobile device 100 may optionally delete the first device security certificate and the first server security certificate. The mobile device 100 may further delete the trust anchor associated with the device key and the server key. This may be done, for example, to prevent malicious attacks using the first device security certificate and the first server security certificate.

In some embodiments, at step 270, once the second server security certificate has been enrolled, the mobile device 100 may optionally establish at least one formal secure connection, separate from the previously established secure connection. Each formal secure connection may be established based on a respective pair of corresponding second server security certificates and second device security certificates. Thus, the formal secure connections may be for communication with, for example, the corporate resources 24 or to the authentication server 150. At step 280, after establishing the formal secure connection, the mobile device 100 may then optionally terminate the secure connection established with the authentication server 150 at step 240.

Once the second set of security certificates are enrolled, the mobile device 100 may exchange data with the authentication server 150 and/or the corporate resources 24 over the formal secure connection, which is secured and verified with the second set of security certificates.

Figure 3B:
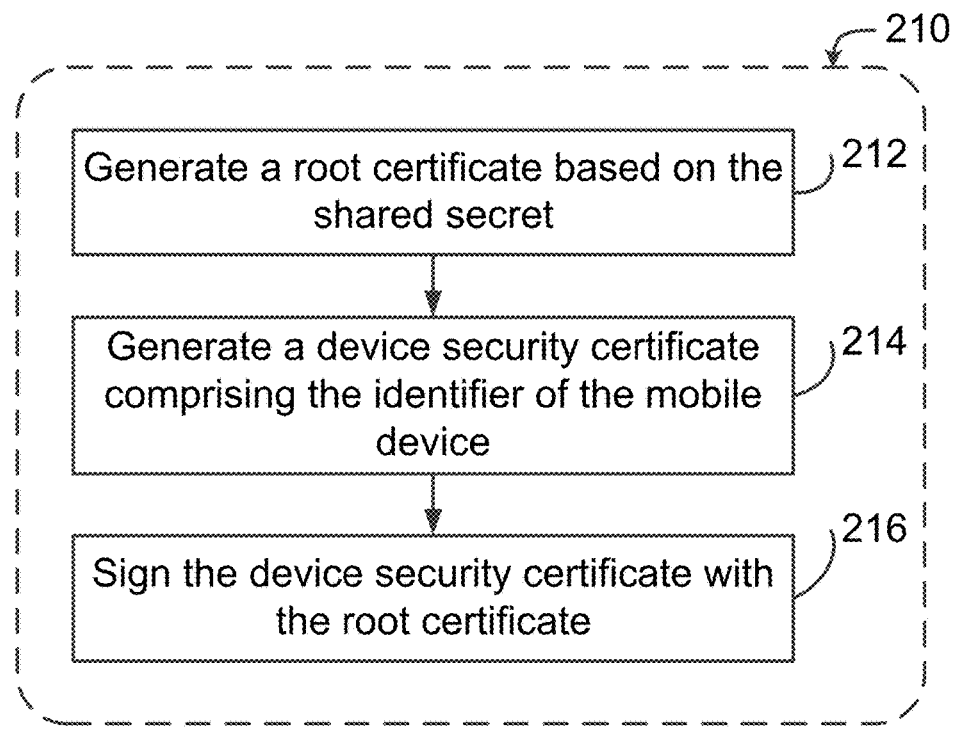

In some embodiments, and with reference to FIG. 3B, step 210 includes a plurality of steps 212, 214, 216. At step 212, the mobile device 100 generates a root certificate based on the device key. To generate the root certificate, the mobile device 100 may retrieve the device key, and any additional information, from a memory of the mobile device 100. The additional information may be, for example, a customer identifier or other suitable information.

At step 214, the mobile device 100 generates the first device security certificate. The first device security certificate comprises the identifier of the mobile device 100, for example stored in the SAN of the first device security certificate.

At step 216, the mobile device 100 signs the first device security certificate with the root certificate. Thus, the first device security certificate may comprise the device key, or a representation of the device key, in a signature of the first device security certificate. Because the device key is known to the authentication server 150 in the form of the shared secret, the authentication server 150 may consider the signature of the first device security certificate as part of the authentication procedure to determine whether the first device security certificate is valid. This is described in greater detail hereinbelow.

Figure 4:
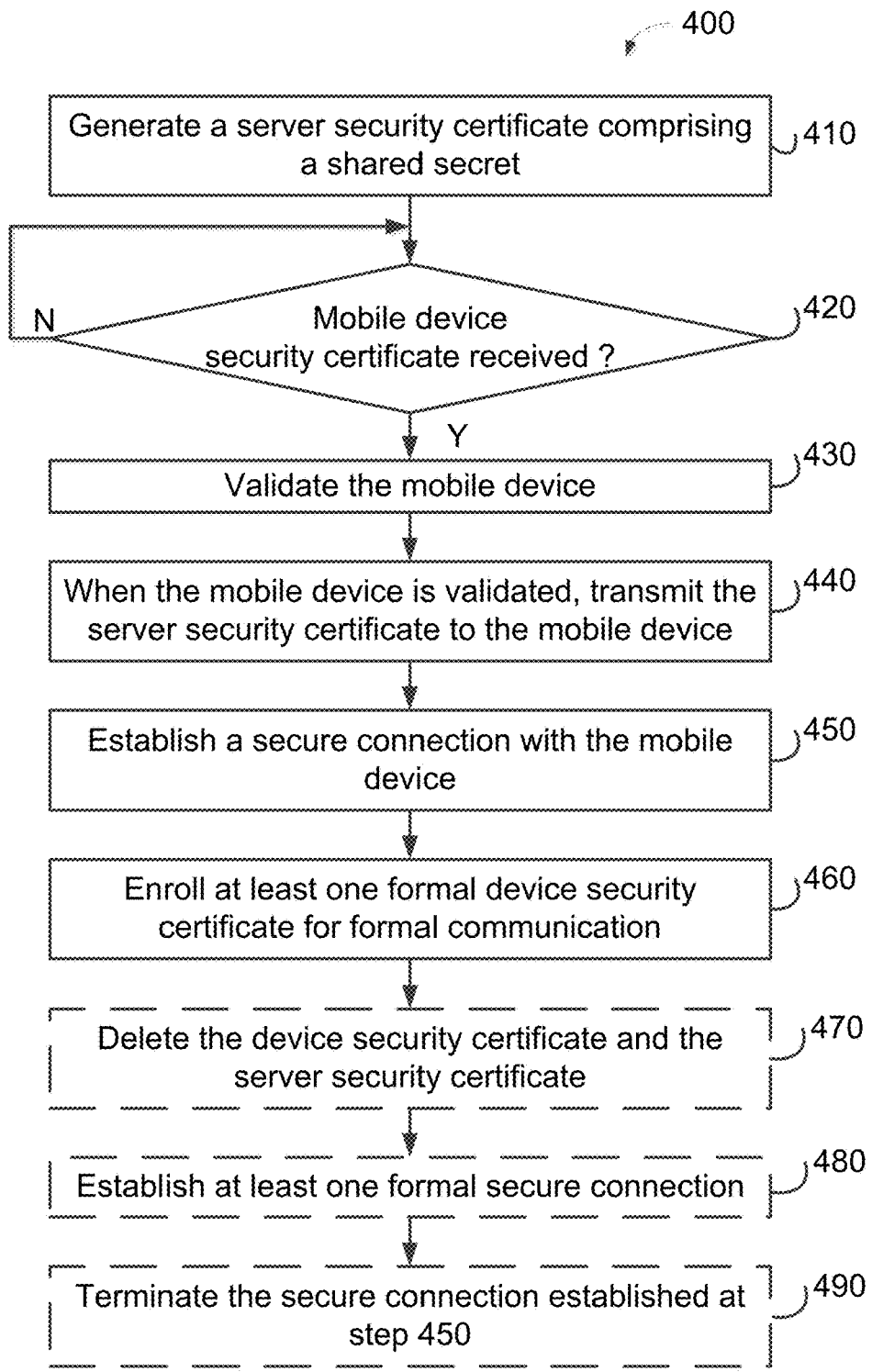
FIG. 4 is a flowchart illustrating a method executed by an authentication server for authenticating a mobile device.

With reference to FIG. 4, the authentication server 150 implements a method 400 for authenticating the mobile device 100. At step 410, the authentication server 150 generates a first server security certificate comprising the shared secret, as represented by the server key. To generate the first server security certificate, the authentication server 150 may retrieve the server key from a memory of the authentication server 150.

The method 400 proceeds to step 430 after the authentication server 150 receives the first device security certificate from the mobile device 100. The authentication server 150 may receive the first device security certificate via any suitable means and over any suitable network of the network 10. In some cases, the authentication server 150 may receive the first device security certificate from the firewall 22₁ or from an element thereof, such as the aforementioned gateway server.

Figure 5A:
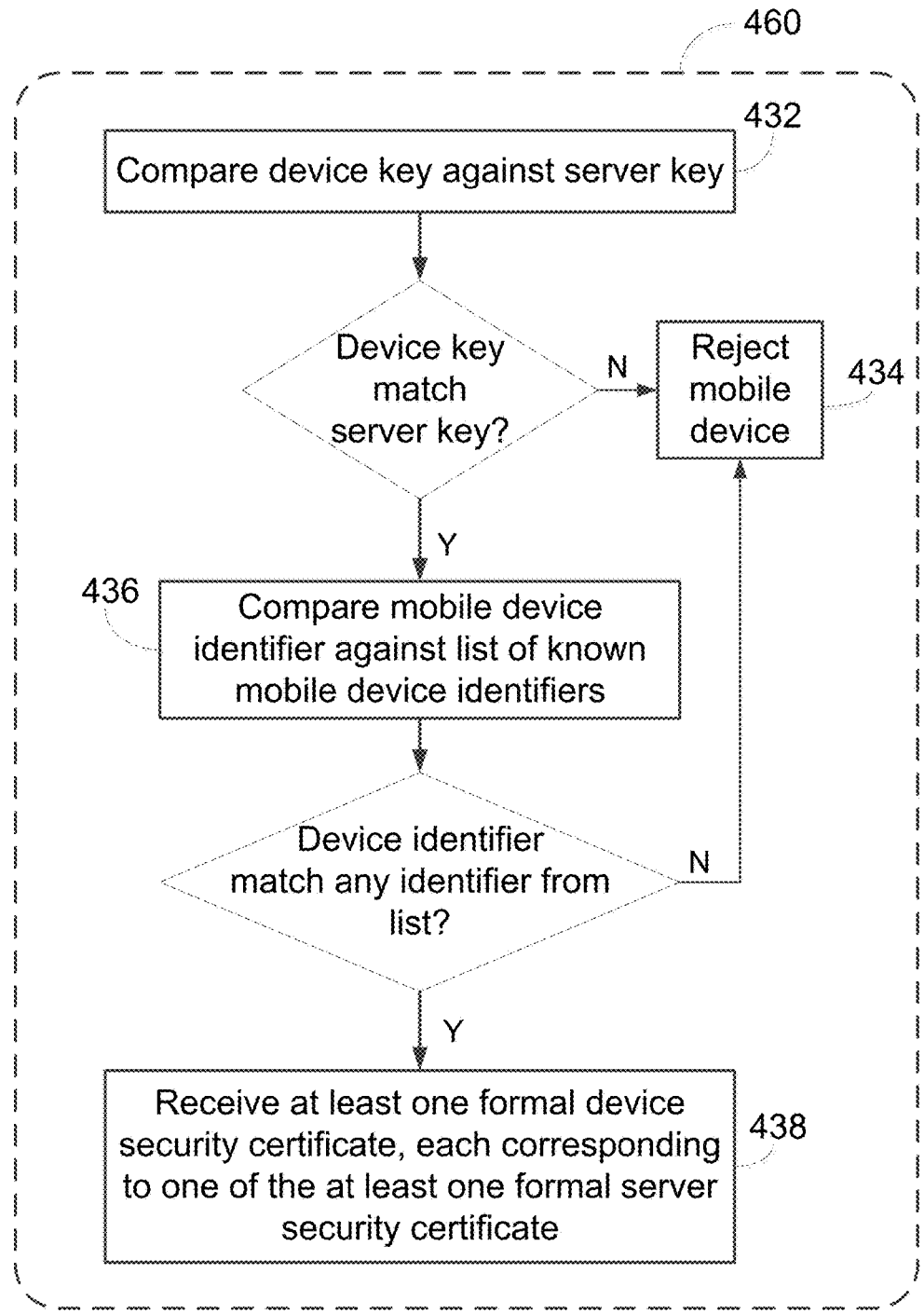
FIGS. 5A, 5B, and 5C are flowcharts illustrating example embodiments for some steps of the method illustrated in FIG. 4.

At step 430, the authentication server 150 validates the mobile device 100. The mobile device 100 is validated by determining if the device security certificate is valid. Determining if the first device security certificate is valid may comprise one or more validation steps, as illustrated in FIG. 5A. At step 432, the authentication server 150 compares the device key against the server key, or compares a representation of the device key against a representation of the server key, as appropriate. The authentication server 150 may extract the device key or the representation thereof from the first device security certificate, for example from the signature of the first device security certificate. If the device key does not match the server key, the authentication server 150 rejects the first device security certificate, as per step 434, and terminates the method 400 without authenticating the mobile device 100.

If the device key matches the server key, or their respective representations match, the authentication server 150 compares the identifier of the mobile device 100, or a representation thereof, against a list of known mobile device identifiers or representations of identifiers, as per step 436. The authentication server 150 may extract the identifier from the first device security certificate, for example from the SAN of the first device security certificate. Depending on the nature of the identifier, the authentication server 150 may compare the identifier against a corresponding list of known mobile device identifiers. For example, if the identifier is a phone number of the mobile device 100, the authentication server 150 may compare the phone number extracted from the first device security certificate against a list of known phone numbers. In another example, if the identifier is a hashed IMEI of the mobile device 100, the authentication server 150 may compare the hashed IMEI extracted from the first device security certificate against a list of hashes of known IMEIs. If the identifier extracted from the first device security certificate has been altered, for example hashed, salted, or repeated, the authentication server 150 may first obtain a list of known mobile device identifiers. The authentication server 150 may then alter the mobile device identifiers in the list of known mobile device identifiers. The authentication server 150 may then compare the extracted identifier against the list of altered known mobile device identifiers. If the identifier matches any of the known mobile device identifiers, the authentication server 150 may accept the first device security certificate. If the identifier does not match any of the known mobile device identifiers, the authentication server 150 rejects the first device security certificate, as per step 434, and terminates the method 400 without authenticating the mobile device 100. In this embodiment, the authentication server 150 validates the first device security certificate at step 438 only if the device key matches the server key and if the identifier matches any of the known mobile device identifiers. Note that the order of step 432 and step 436 may be reversed, that is to say, the authentication server 150 may first compare the identifier of the mobile device 100 against a list of known device identifiers, and the authentication server 150 may then compare the device key against the server key. Alternatively still, the two validation steps may be performed concurrently.

Referring back to FIG. 4, at step 440, when the mobile device 100 is validated, the authentication server 150 transmits the first server security certificate to the mobile device 100.

At step 450, the authentication server 150 establishes the secure connection with the mobile device 100. The exchange of data between the mobile device and the authentication server 150 may be secured and validated with the first device security certificate and the first server security certificate.

At step 460, the authentication server 150 enrolls at least one second server security certificate for formal communication. As discussed hereinabove, the second server security certificate may be generated by the authentication server 150. In such cases, the authentication server 150 may generate both the second server security certificate and the second device security certificate. The authentication server 150 may then enroll both the second server security certificate and the second device security certificate.

Figure 5B:
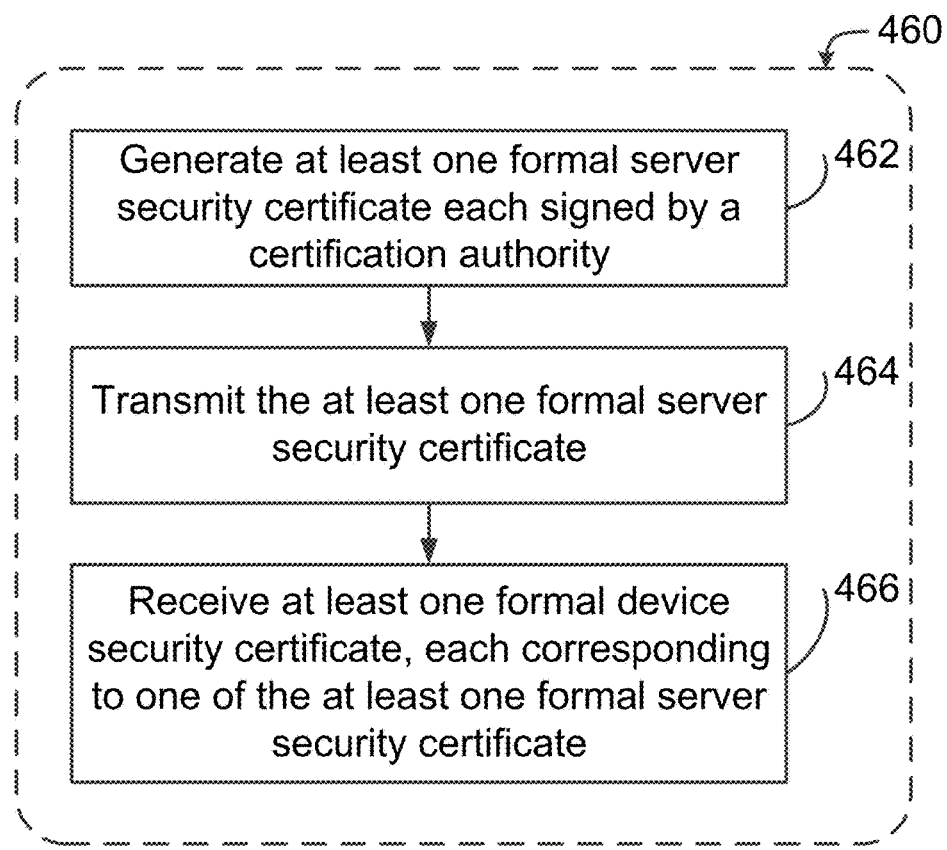

In some embodiments, the second device security certificate is received from the mobile device 100. In such cases, and with reference to FIG. 5B, step 460 includes a plurality of steps 462, 464, 466. At step 462, the authentication server 150 generates the one or more second server security certificate. The certification authority of the authentication server 150 may sign one or more second server security certificate. At step 464, the authentication server 150 transmits the second server security certificate to the mobile device 100. The second server security certificate may be transmitted over the secure connection established in step 450 of method 400. At step 466, the authentication server 150 receives the second device security certificate from the mobile device 100. Each second device security certificate may correspond to one second server security certificate.

In some embodiments, the method 400 of FIG. 4 comprises additional optional steps, such as steps 470, 480, and 490. At step 470, once the second device security certificate has been enrolled, the authentication server 150 deletes the first device security certificate and the first server security certificate. This may be done, for example, to prevent malicious attacks using the first device security certificate and the first server security certificate.

At step 480, once the second server security certificate has been enrolled, the authentication server 150 establishes at least one formal secure connection. Each formal secure connection may be established based on a respective pair of corresponding second server security certificates and second device security certificates. Thus, the formal secure connections may be for formal communication with, for example, the mobile device 100. At step 490, after establishing the formal secure connection, the authentication unit 150 terminates the secure connection with the mobile device 100 established at step 450.

Figure 5C:
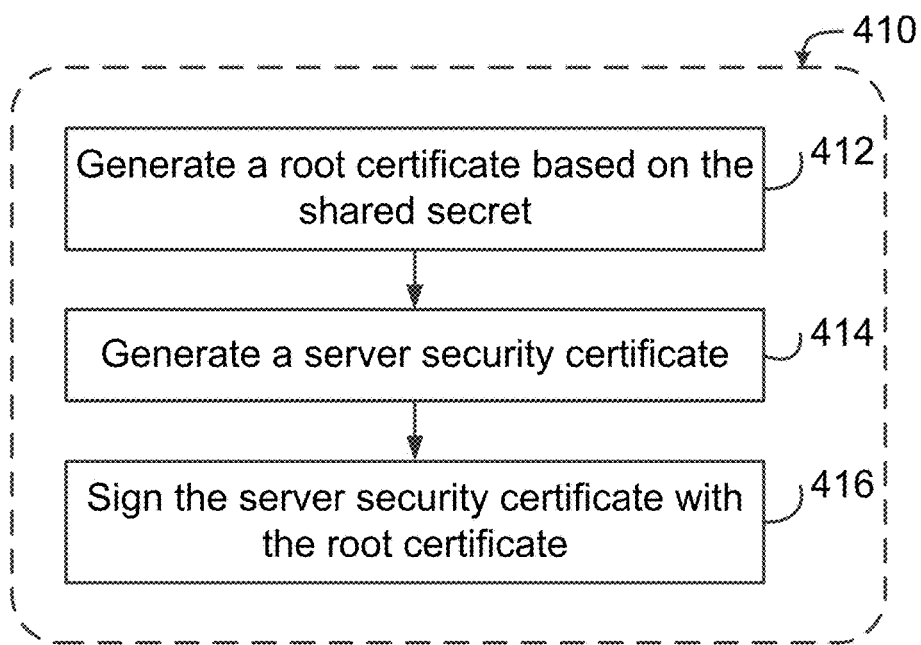

In some embodiments, and with reference to FIG. 5C, step 410 includes a plurality of steps 412, 414, 416. At step 412, the authentication server 150 generates a root certificate. The root certificate generated by the authentication server 150 may be generated in substantially similar fashion to the way the mobile device 100 generates the root certificate in step 212. Thus, the root certificate generated by the authentication server 150 may be identical to the root certificate generated by the mobile device 100. At step 414, the authentication server 150 generates the first server security certificate. The first server security certificate may be a randomly-generated key pair. At step 416, the authentication server 150 signs the first server security certificate with the root certificate in substantially similar fashion to the way the mobile device 100 signed the first device security certificate in step 216. Thus, the signature on the first server security certificate may be identical to the signature on the first device security certificate.

Once the second security certificates are enrolled, the authentication unit 150 has successfully authenticated the mobile device 100.

Figure 6:
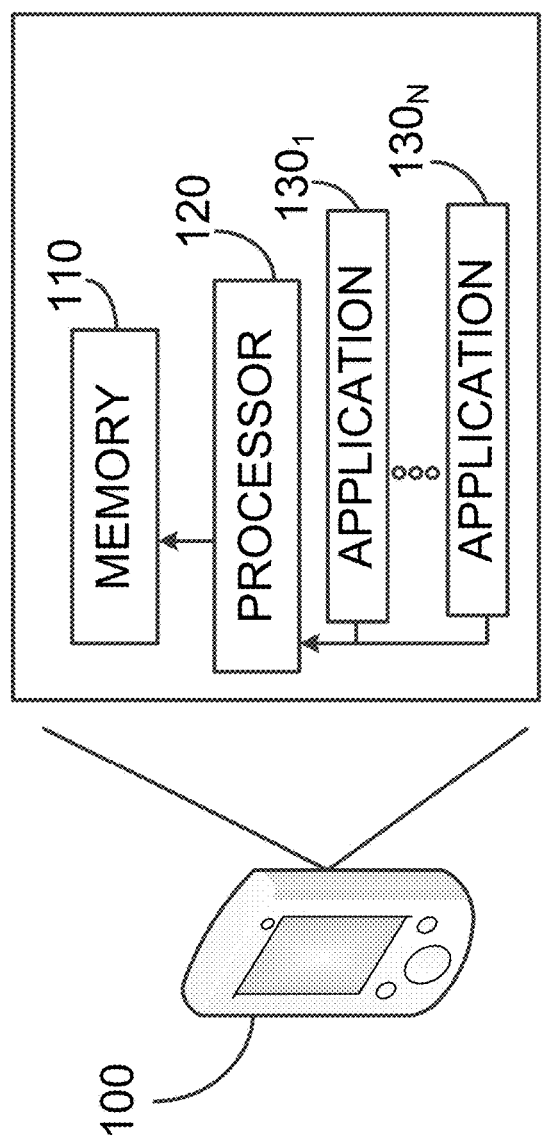
FIG. 6 is a block diagram of an example mobile device considered within the context of the present description.

The authentication procedure described in methods 200, 400, can be implemented between any suitable mobile device 100 and authentication server 150. With reference now to FIG. 6, the mobile device 100 comprises any suitable type of processor 120, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The mobile device 100 also comprises any suitable type of computer memory 110, the computer memory 110 being located internally or externally. For example, the mobile device 100 may include random-access memory (RAM), read-only memory (ROM), optical-disc-based read-only memory, electro-optical memory, magneto-optical memory, erasable programmable read-only memory (EPROM), electrically-erasable programmable read-only memory (EEPROM), Ferroelectric RAM (FRAM), and the like. The mobile device 100 may comprise a network interface (not pictured) in order to communicate with other components, to access and connect to network resources, and to perform other computing applications by connecting to one or more networks capable of carrying data. The one or more networks may include network 10, the corporate network 20, and any other suitable networks.

The mobile device 100 is configured to run or execute any number of applications $130_1$-$130_N$. The applications $130_1$-$130_N$ are stored in the memory 110 of the mobile device 100, and are executed by the processor 120. One such application, for example application $130_1$, is a device-side authentication application $130_1$.

Figure 7:
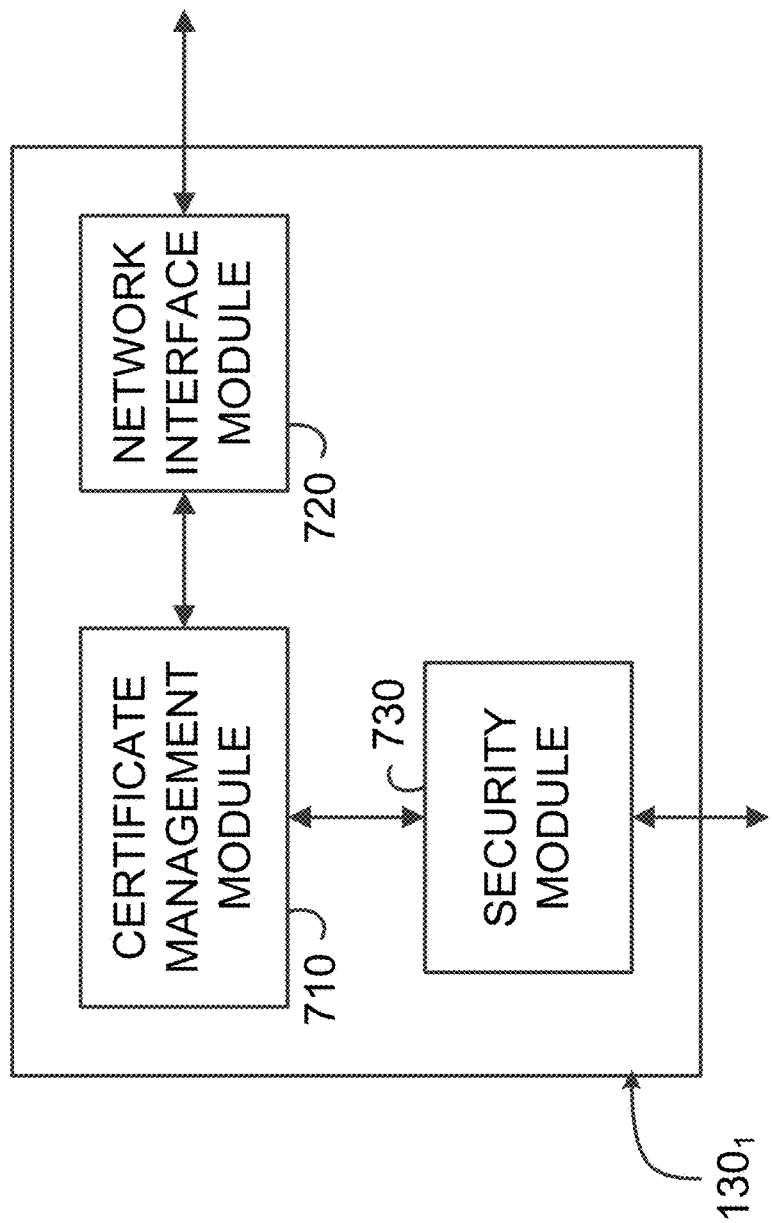
FIG. 7 is a block diagram of a mobile device-side application for authenticating the mobile device.

With reference to FIG. 7, the device-side authentication application $130_1$ comprises a certificate management module 710, a network interface module 720, and a security module 730. The certificate management module 710 is configured for generating the device security certificates. In order to generate the device security certificates, the certificate management module 710 is configured for requesting the identifier and the device key, or representations thereof, from the security module 730.

The security module 730 is configured for acquiring the identifier and the device key, or representations thereof, for example from the memory 110, and for providing the identifier and the device key to the certificate management module 710. In embodiments where the device identifier is altered before being placed in the first device security certificate, the security module 730 is configured for hashing, salting, repeating, or otherwise altering the device identifier. The certificate management module 710 is configured for first generating the root certificate based on the device key, then for generating the first device security certificate, for storing the device identifier in the SAN of the first device security certificate, and for signing the first device security certificate with the root certificate.

The certificate management module 710 is also configured for providing the first device security certificate to the network interface module 720 for transmission to the authentication server 150. The network interface module 720 is configured for transmitting the first device security certificate to the authentication server 150 upon receiving the first device security certificate. The network interface module 720 may further be configured for thereafter receiving the first server security certificate from the authentication server 150 and for providing the first server security certificate to the certificate management module 710.

The certificate management module 710 is configured for receiving the first server security certificate from the network interface module 720. The certificate management module 710 is configured for, upon receipt of the first server security certificate, validating the first server security certificate by validating the signature of the first server security certificate. The certificate management module 710 is configured for storing the first server security certificate, for example in the memory 110. The certificate management module 710 may be configured for instructing the network interface module 720 to establish the secure connection with the authentication server 150 once the first server security certificate is received.

The network interface module 720 is configured for establishing the secure connection with the authentication server 150 responsive to the request received from the certificate management module. The network interface module 720 is configured for receiving the one or more second server security certificate from the authentication server 150 and for providing the one or more second server security certificate to the certificate management module 710.

The certificate management module 710 is configured for receiving the one or more second device security certificate from the network interface module 720 and for enrolling the one or more second device security certificate. Enrolling the second device security certificates may comprise, for example, the certificate management module 710 being configured for storing the second device security certificates in the memory 110. Alternatively, enrolling the second device security certificates may comprise, for example, the certificate management module 710 being configured for generating the second device security certificates and requesting that the network interface module 720 transmit the second device security certificates to the authentication unit 150. In this example, enrolling the second device security certificates may comprise the network interface module 720 being configured for transmitting the second device security certificates to the authentication unit 150 in response to receiving the request from the certificate management module 710.

In some embodiments, the certificate management module 710 is configured for deleting the first device security certificate and the first server security certificate after enrolling the second device security certificate and the second server security certificate. The certificate management module 710 may be configured for instructing the security module 730 to delete the trust anchor associated with the shared secret. In some embodiments, the network interface module 720 is configured for establishing the formal secure connection, and for terminating the secure connection after establishing the formal secure connection.

Figure 8:
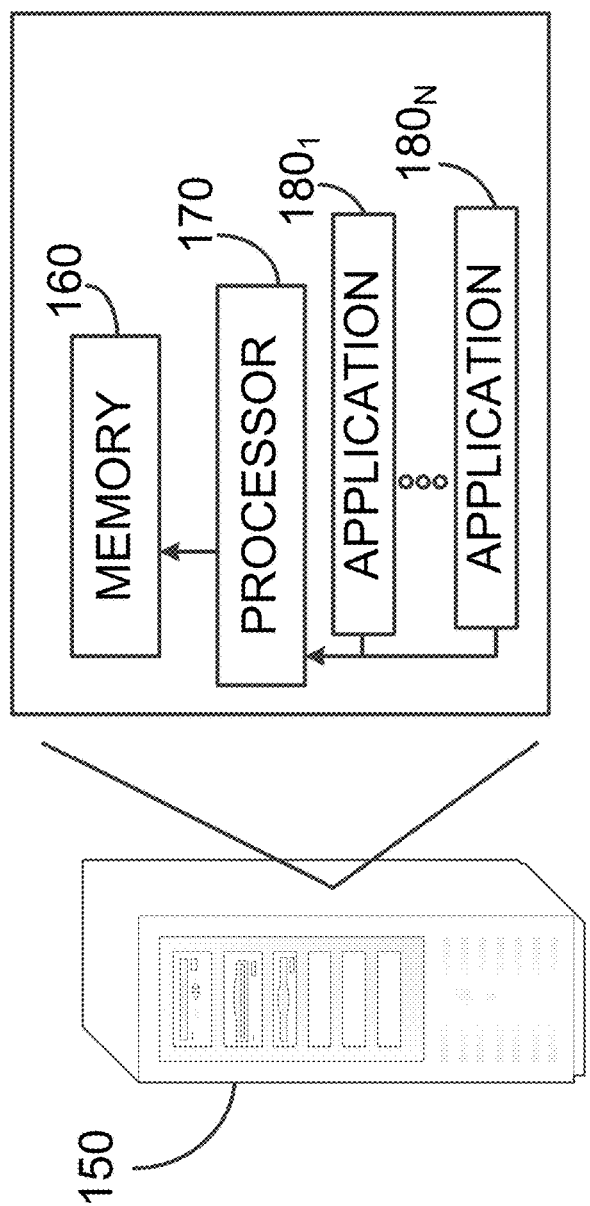
FIG. 8 is a block diagram of an example authentication server considered within the context of the present description.

With reference now to FIG. 8, the authentication server 150 comprises any suitable type of processor 170, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The authentication server 150 also comprises any suitable type of computer memory 160, the computer memory 160 being located internally or externally. For example, the authentication server 150 may include random-access memory (RAM), read-only memory (ROM), optical-disc-based read-only memory, electro-optical memory, magneto-optical memory, erasable programmable read-only memory (EPROM), electrically-erasable programmable read-only memory (EEPROM), Ferroelectric RAM (FRAM), and the like. The authentication server 150 may comprise a network interface (not pictured) in order to communicate with other components, to access and connect to network resources, and to perform other computing applications by connecting to one or more networks capable of carrying data. The one or more networks may include network 10, the corporate network 20, and any other suitable networks.

The authentication server 150 is configured to run or execute any number of applications $180_1$-$180_N$. The applications $180_1$-$180_N$ are stored in the memory 160 of the authentication server 150, and executed by the processor 170. One such application, for example application $180_1$, is a server-side authentication application $180_1$.

Figure 9:
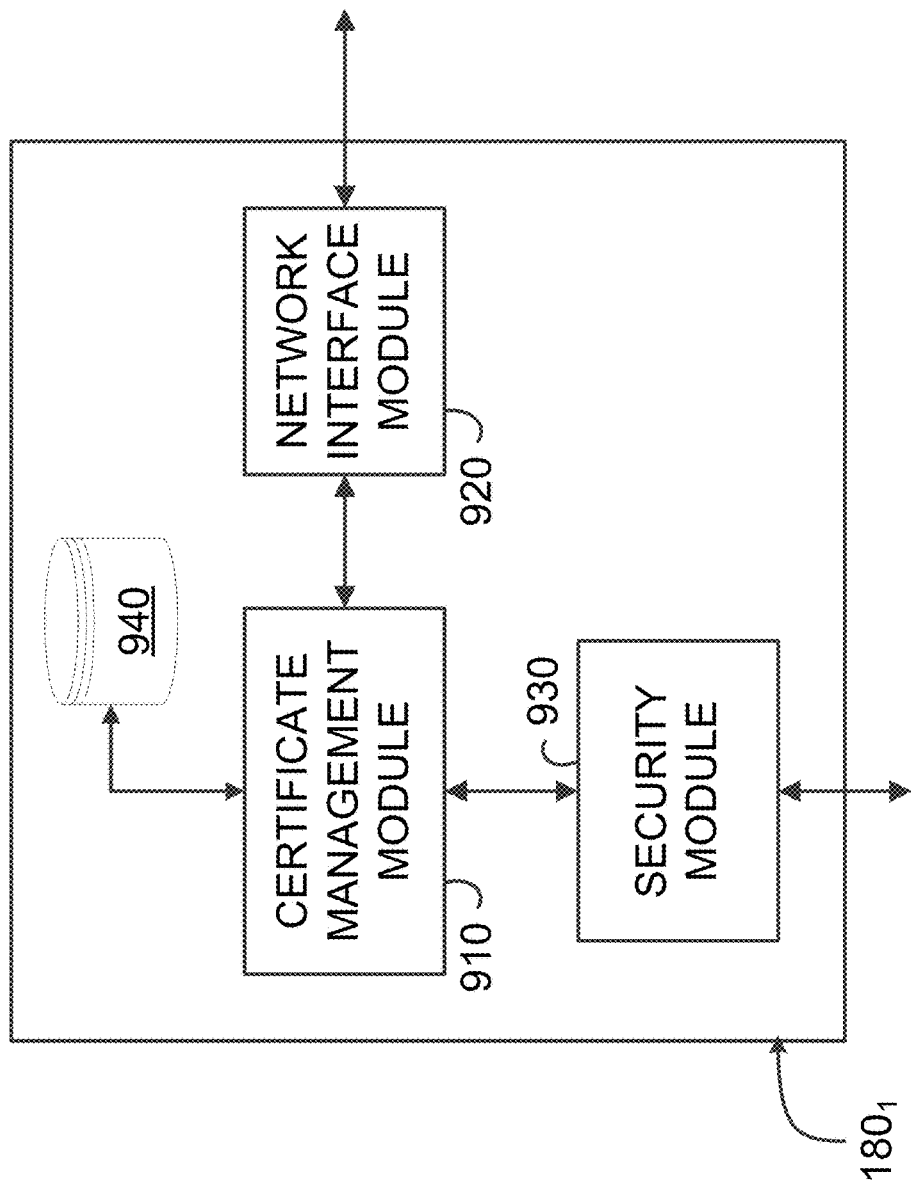
FIG. 9 is a block diagram of an authentication server-side application for authenticating the mobile device.

With reference to FIG. 9, the server-side authentication application $180_1$ comprises a certificate management module 910, a network interface module 920, a security module 930, and a database 940. The certificate management module 910 is configured for generating a first server security certificate. In order to generate the first server security certificate, the certificate management module 910 may be configured for requesting the server key and the randomly-generated key pair from the security module 930.

The security module 930 is configured for acquiring the server key, or a representation thereof, for example from the memory 160, and for providing the server key or a representation of the server key to the certificate management module 910. The security module 930 is configured for providing the randomly-generated key pair to the certificate management module 910. The certificate management module 910 is configured for generating the root certificate based on the server key, for generating the first server security certificate, and for signing the first server security certificate with the root certificate.

The network interface module 920 is configured for receiving the first device security certificate from the mobile device 100 and for providing the first device security certificate to the certificate management module 910. The certificate management module 910 is configured for receiving the first device security certificate from the network interface module 920. The certificate management module 910 may be configured for, upon receipt of the first device security certificate, validating the mobile device 100 by comparing the device key of the first device security certificate and the identifier stored in the first device security certificate against the server key and the list of known mobile device identifiers, respectively, or by comparing representations thereof. To validate the identifier, the certificate management module 910 may be configured for acquiring the list of known mobile device identifiers or mobile device identifier representations from the database 940 and for comparing the identifier against the list of known mobile device identifiers.

When the mobile device 100 is validated, the certificate management module 910 is configured for instructing the network interface module 920 to transmit the first server security certificate to the mobile device 100. The network interface module 920 is configured for transmitting the first server security certificate to the mobile device 100 in response to the instructions received from the certificate management module 910. The network interface module 920 is configured for establishing the secure connection with the mobile device 100.

The certificate management module 910 is configured for enrolling the one or more second server security certificate. Enrolling the second server security certificates may comprise, for example, the certificate management module 910 being configured for generating the second server security certificates and storing the second server security certificates in the memory 160. Enrolling the second device security certificates may comprise the certificate management module 910 being configured for requesting that the network interface module 920 transmit the second server security certificates to the mobile device 100. In this example, enrolling the second server security certificates may comprise the network interface module 920 being configured for transmitting the second server security certificates to the mobile device 100 in response to receiving the request from the certificate management module 910. Enrolling the second server security certificates may further comprise the network interface module 920 being configured for receiving the second device security certificates from the mobile device 100 and for providing the second device security certificates to the certificate management module 910. The certificate management module 910 may then store the second device security certificates, for example in the memory 160. Alternatively, the certificate management module 930 may generate the second device security certificates and provide them to the network interface module 920, which may in turn transmit the second device security certificates to the mobile device 100

In some embodiments, the certificate management module 910 is configured for deleting the first device security certificate and the first server security certificate after enrolling the second device security certificates and the second server security certificates. In some embodiments, the network interface module 920 is configured for establishing the formal secure connection, and for terminating the secure connection after establishing the formal secure connection.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Each such computer program may be stored on a storage media or a device, for example a ROM, a magnetic disk, an optical disc, a flash drive, or any other suitable storage media or device. The computer program may be readable by a general or special purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present system and method may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A method, comprising:
generating, at a mobile device, a first device security certificate, the first device security certificate including a representation of an identifier of the mobile device and a representation of a device key in a signature of the first device security certificate;
transmitting, by the mobile device, the first device security certificate to an authentication server;
receiving, at the mobile device, a server security certificate from the authentication server in response to a successful authentication by the authentication server, the server security certificate including a representation of a server key in a signature of the server security certificate, the server key corresponding to the device key and to a representation of a shared secret stored on the mobile device and known by the authentication server;
validating, at the mobile device, the server security certificate based on the signature of the server security certificate that includes the representation of the server key;
establishing, by the mobile device, a secure connection with the authentication server based on the first device security certificate and the server security certificate; and
enrolling, at the mobile device, at least one second device security certificate for formal communication over the secure connection.

2. The method of claim 1, wherein generating the first device security certificate comprises:
generating a root certificate based on the device key; and
signing the first device security certificate with the root certificate.

3. The method of claim 1, wherein generating the first device security certificate including the representation of the identifier of the mobile device comprises providing at least part of an International Mobile Station Equipment Identity (IMEI) of the mobile device in the first device security certificate.

4. The method of claim 3, wherein generating the first device security certificate including the representation of the identifier of the mobile device comprises providing a hash of the IMEI of the mobile device in the first device security certificate.

5. The method of claim 1, wherein establishing the secure connection comprises establishing a transport layer security tunnel.

6. The method of claim 1, wherein enrolling the at least one second server security certificate comprises receiving, from the authentication server, over the secure connection, the at least one second device security certificate signed by a certification authority of the authentication server.

7. The method of claim 1, further comprising deleting the first device security certificate and the server security certificate after the at least one second device security certificate has been enrolled.

8. The method of claim 1, wherein the secure connection is a temporary secure connection, and further comprising establishing at least one formal secure connection, separate from the temporary secure connection, with the authentication server, based on the at least one second device security certificate.

9. The method of claim 8, wherein establishing the at least one formal secure connection comprises terminating the temporary secure connection after establishing the at least one formal secure connection.

10. A mobile device, comprising:
a processing unit; and
a memory, communicatively coupled to the processing unit and comprising computer-readable program instructions executable by the processing unit for:
generating, at a mobile device, a first device security certificate, the first device security certificate including a representation of an identifier of the mobile device and a representation of a device key in a signature of the first device security certificate;
transmitting, by the mobile device, the first device security certificate to an authentication server;

receiving, at the mobile device, a server security certificate from the authentication server in response to a successful authentication by the authentication server, the server security certificate including a representation of a server key in a signature of the server security certificate, the server key corresponding to the device key and to a representation of a shared secret stored on the mobile device and known by the authentication server;

validating, at the mobile device, the server security certificate based on the signature of the server security certificate that includes the representation of the server key;

establishing, by the mobile device, a secure connection with the authentication server based on the first device security certificate and the server security certificate; and enrolling, at the mobile device, at least one second device security certificate for formal communication over the secure connection.

11. The mobile device of claim 10, wherein generating the first device security certificate comprises:

generating a root certificate based on the device key; and signing the first device security certificate with the root certificate.

12. The mobile device of claim 10, wherein generating the first device security certificate including the representation of the identifier of the mobile device comprises providing at least part of an International Mobile Station Equipment Identity (IMEI) of the mobile device in the first device security certificate.

13. The mobile device of claim 12, wherein generating the first device security certificate including the representation of the identifier of the mobile device comprises providing a hash of the IMEI of the mobile device in the first device security certificate.

14. The mobile device of claim 10, wherein establishing the secure connection comprises establishing a transport layer security tunnel.

15. The mobile device of claim 10, wherein enrolling the at least one second server security certificate comprises receiving, from the authentication server, over the secure connection, the at least one second device security certificate signed by a certification authority of the authentication server.

16. The mobile device of claim 10, further comprising deleting the first device security certificate and the server security certificate after the at least one second device security certificate has been enrolled.

17. The mobile device of claim 10, wherein the secure connection is a temporary secure connection, and wherein the program instructions are further executable by the processing unit for establishing at least one formal secure connection, separate from the temporary connection, with the authentication server based on the at least one second device security certificate.

18. The mobile device of claim 17, wherein establishing the at least one formal secure connection comprises terminating the temporary secure connection after establishing the at least one formal secure connection.

* * * * *